(No Model.)
J. E. OGLESBY.
SAW GUMMER OR SHARPENER.
No. 529,299. Patented Nov. 13, 1894.
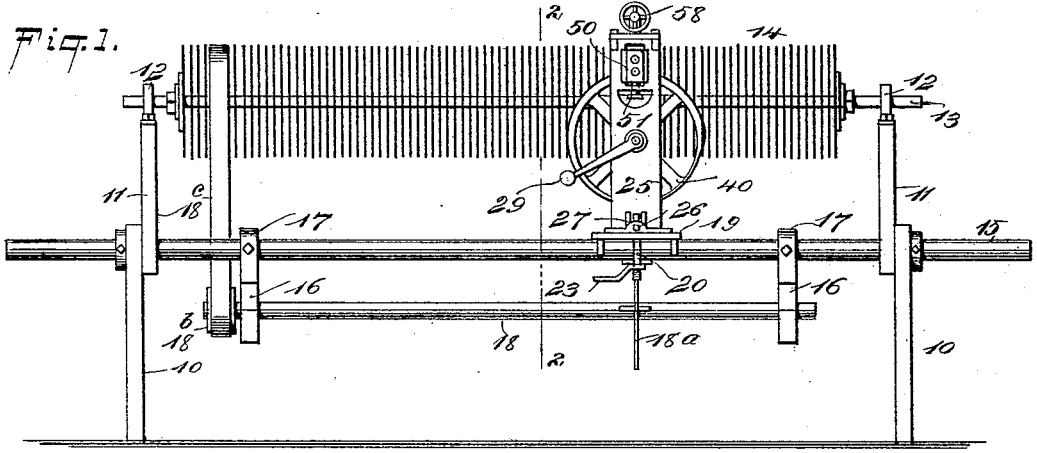
Fig. 1.
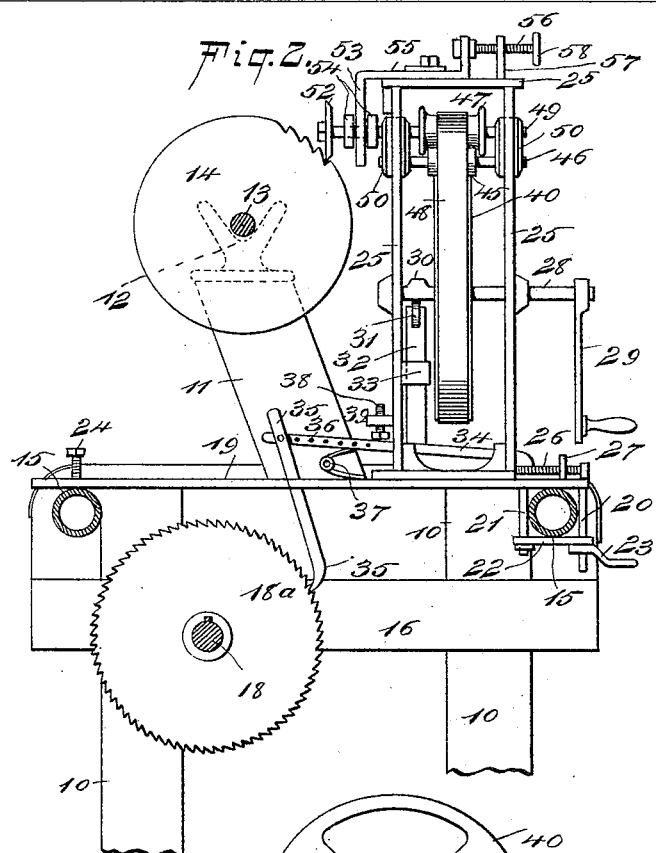
Fig. 2.
Fig. 3.
WITNESSES:
William Goebel
W. B. Hutchinson
INVENTOR
J. E. Oglesby
BY
Munn & Co
ATTORNEYS.

UNITED STATES PATENT OFFICE.

JERROLD E. OGLESBY, OF LADONIA, TEXAS.

SAW GUMMER OR SHARPENER.

SPECIFICATION forming part of Letters Patent No. 529,299, dated November 13, 1894.

Application filed May 24, 1894. Serial No. 512,317. (No model.)

*To all whom it may concern:*

Be it known that I, JERROLD E. OGLESBY, of Ladonia, in the county of Fannin and State of Texas, have invented a new and Improved Linter and Gin-Saw Gummer or Sharpener, of which the following is a full, clear, and exact description.

My invention relates to improvements in that class of devices which are used in grinding or filing the saws of a cotton gin or linter.

The object of my invention is to produce a comparatively simple apparatus of this kind, which may be easily applied to a gang of gin saws, which is arranged in such a manner that the grinder may be quickly and nicely adjusted so as to properly fit the teeth of the saws and to enter between them to any desired distance, also to provide a simple and efficient feed mechanism which moves the saws tooth by tooth as they are ground, to provide a simple means of regulating the pitch of the grinder, and in general to produce a machine which enables the saws to be rapidly and nicely ground so as to leave the teeth their full, original length and openness.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a front elevation of the apparatus embodying my invention, showing it applied to a gang of gin saws. Fig. 2 is an enlarged vertical cross section on the line 2—2 of Fig. 1; and Fig. 3 is a detail view of the cam-driving wheel.

The machine is provided with suitable supports 10, which form the ends of the supporting frame, and these carry arms 11 which extend upward and support the forked brackets 12, in which is held the mandrel 13 of the saws 14, which are arranged in the usual way, and it will be seen by reference to Fig. 2, that the brackets are adapted to support a mandrel of any usual kind.

The end supports 10 are connected by shafts 15 which are preferably hollow to make them light, and cross frames 16 are supported on these shafts by means of brackets or hangers 17, these cross frames carrying the feed shaft 18 on which is held a suitable ratchet wheel $18^a$, or a saw will answer as well. This ratchet wheel is adapted to connect with the grinding mechanism, as hereinafter described, and it provides means for turning the feed wheels and the saws 14, with which it connects by means of a pulley $18^b$ on the feed shaft, and a belt $18^c$ running from the pulley to the saws, the belt engaging several of the saws, as shown in Fig. 1.

On the shafts 15 is supported a carriage 19, which is fastened to the front shaft 15 by means of a clamp which may be of any suitable kind, but which is preferably best shown in Fig. 2, comprising depending bolts 20 and 21 on the carriage, a cross plate 22 on the bolts, and a lever nut 23 on the bolt 20 to force the cross plate into close contact with the shaft 15, which is embraced by the said cross plate and the two bolts. The rear end of the carriage is provided with a set screw 24, which projects downward through the carriage and impinges on the rear shaft 15, see Fig. 2, and thus the pitch of the carriage and consequently of the grinder may be regulated.

The carriage 19 has mounted upon it an upright frame 25, which is adjusted in and out by means of a set screw 26, see Fig. 2, turning in a lug 27 on the carriage. The frame 25 is provided with a crank shaft 28 having a crank 29 on the front end thereof; but if desired a pulley may be substituted for the crank. The shaft 28 is provided with a cam 30 which is adapted to engage the roller 31 on the slide 32, which moves vertically in a guide 33 and is connected with the vertically swinging lever 34 carrying a pawl 35 which may be secured in either of the holes 36 of the lever, and which is adapted to engage the ratchet wheel $18^a$ so that, at every revolution of the shaft 28, the pawl is depressed, the ratchet wheel turned, and movement imparted to the feed shaft 18, and by means of the belt $18^c$, to the saws 14.

The pawl and its lever 34 are raised by a spring 37 which is arranged between the lever and the carriage. The throw of the pawl is limited by a set screw 38, which is adjustable in a lug 39 on the back side of the frame 25.

By adjusting this set screw, it will be seen that the pawl may be regulated so as to turn the saws 14 the full distance of a tooth at every revolution of the shaft 28, or the saws may be moved any desired distance.

The shaft 28 carries a driving wheel 40, which has a cam face 41 this being thinned on one side, and this thinned portion is produced very gradually at one end and abruptly at the other, as shown at 42 in Fig. 3, so that the friction wheel, which is driven by the cam wheel, will be permitted to move downward very slowly, but will be quickly raised. The object of this is to enable the grinder to have a similar movement, so that it will move downward only as fast as it grinds but will move quickly upward so as to engage another tooth.

A friction pulley 45 rides on the driving wheel 40 and is secured to a shaft 46, the pulley engaging a second pulley 47 above it, which is driven by the belt 48 extending over the driving wheel 40, and the pulley 47 is secured to the shaft 49 which carries the grinder, both shafts 49 and 46 being secured in sliding boxes 50 which are mounted in the frame 25, and thus the cam wheel 40, when revolved, imparts an up and down movement to the pulleys and to the grinder shaft, while the latter is also revolved by the belt 48. The belt 48 is elastic, so as to permit of both movements. The downward movement of the slide boxes 50 is limited by set screws 51 which are arranged beneath them in the frame 25, as shown in Fig. 1.

The shaft 49 carries a grinder 52 of the usual kind, which is adapted to grind or file the teeth of the saws 14. The shaft 49 is adjustable in and out, sliding in its bearings so that the depth which it projects into the saw teeth may be regulated, this adjustment being effected by the fork 53 which is held between the collars 54 on the shaft, and which has a shank 55 sliding on the top of the frame 25 and adjusted by means of the screw 56 which is threaded in a support 57 on the frame 25 and has a hand wheel 58 by which it may be turned.

It will be seen that by turning the shaft 28, the grinder is turned so as to grind the teeth of the saw, and when the teeth, with which the grinder is in contact, have been filed, the cam wheel raises the grinder while the cam 30 depresses the pawl 35 in the manner already described, and turns the feed shaft and saws so as to bring fresh teeth into engagement with the grinder. When all the teeth of the saws opposite the grinder have been ground, the carriage 19 is moved along so as to bring the grinder opposite other saws, and the operation is repeated until all the saws have been ground.

Having thus described my invention, I claim as new and desire to secure by Letters Patent—

1. A device of the kind described, comprising a supporting frame having means for carrying a gang of gin saws, a revoluble feed shaft journaled on the frame, a driving connection between the feed shaft and the saws, a ratchet wheel on the feed shaft, a carriage held to slide on the frame, a revoluble driving shaft on the carriage, means for turning the ratchet wheel by the movement of the driving shaft, a revoluble and vertically movable grinder carried by the carriage, a driving wheel on the driving shaft, and means for revolving and reciprocating the grinder by the movement of the driving wheel, substantially as described.

2. In a machine of the kind described, the combination with a carriage, and a frame on the carriage, of a shaft mounted in sliding bearings in the said frame, a grinding wheel on the shaft, a cam driving wheel for imparting a quick upward movement to the grinder shaft and a slow downward movement to the same, and means for rotating the grinder from the said cam driving wheel, substantially as described.

3. In a machine of the kind described, the combination, with the carriage and a frame on the carriage, of the cam driving wheel journaled in the said frame, the vertically movable and revoluble grinder shaft above the driving wheel, the grinder on the grinder shaft, the friction pulley between the grinder shaft and the driving wheel, and an elastic belt connecting the driving wheel and grinder shaft, substantially as described.

4. The combination, with the supporting frame, the feed shaft thereon, and the ratchet wheel carried by the feed shaft, of the carriage on the frame, the revoluble driving shaft on the carriage, grinding mechanism driven by the shaft, a vertically swinging lever below the shaft, a pawl carried by the lever and engaging the ratchet wheel, a slide connected with the lever and operated by the cam on the driving shaft, and means for regulating the throw of the lever, substantially as described.

5. In a machine of the kind described, the combination with the grinding mechanism, and the driving shaft therefor, of a feed shaft, a ratchet wheel on the feed shaft, a pivoted and spring pressed lever, a pawl carried by the lever and engaging the ratchet wheel, a slide connected with said lever, and a cam on the driving shaft and engaging the said slide, substantially as described.

JERROLD E. OGLESBY.

Witnesses:
J. F. HOLMES,
WILL HARKINS.